May 2, 1933.  T. LAURENT  1,907,259

LINE BALANCING CIRCUIT

Filed June 25, 1930   2 Sheets-Sheet 1

Inventor
T. Laurent
By Marks Clerk
Attys.

May 2, 1933. T. LAURENT 1,907,259

LINE BALANCING CIRCUIT

Filed June 25, 1930 2 Sheets-Sheet 2

Inventor
T. Laurent
By Marks & Clerk
Attys.

Patented May 2, 1933

1,907,259

UNITED STATES PATENT OFFICE

TORBEN LAURENT, OF STOCKHOLM, SWEDEN, ASSIGNOR TO TELEFONAKTIEBOLAGET L. M. ERICSSON, OF STOCKHOLM, SWEDEN, A COMPANY OF SWEDEN

LINE BALANCING CIRCUIT

Application filed June 25, 1930, Serial No. 463,755, and in Sweden July 5, 1929.

The present invention relates to a line balancing circuit arrangement to be used when connecting a pupinized or loaded cable or other similar line to a repeater or the like. In such connections the line balance has hitherto been adjusted in relation to the line in such a manner that the impedances of both become substantially equal for all frequencies. The line balance has then been made as an impedance complex, the characteristic of which varies with the frequency in substantially the same manner as the line characteristic, or else the line characteristic has been transformed to an impedance independent of the frequency by the addition of a suitable line extension, an ohmic resistance being then used as a line balance.

The present invention has for its object another solution of the problem in question, the balancing for different frequencies being obtained with a better approximation than in the known arrangements. According to the invention, two branches of the bridge, of which the two other branches are formed by the line and the line balance, are formed with different impedances, the mutual ratio of which is variable with the frequency in substantially the same manner as the ratio between the impedances of the line and of the line balance. As a line balance, preferably a purely ohmic resistance is selected. A differential transformer is preferably included in the circuit arrangement in a manner known per se, the secondary winding branches of which transformer each are included in one of those two branches in the bridge, which are opposite to the line and the line balance respectively. Mutually different capacity and induction impedances respectively, suitably adjusted, are connected to the two winding branches.

Figure 5:
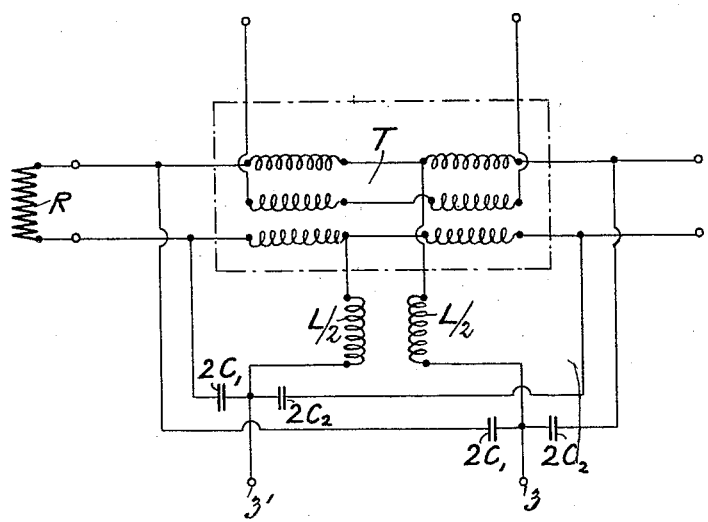
Figure 6:
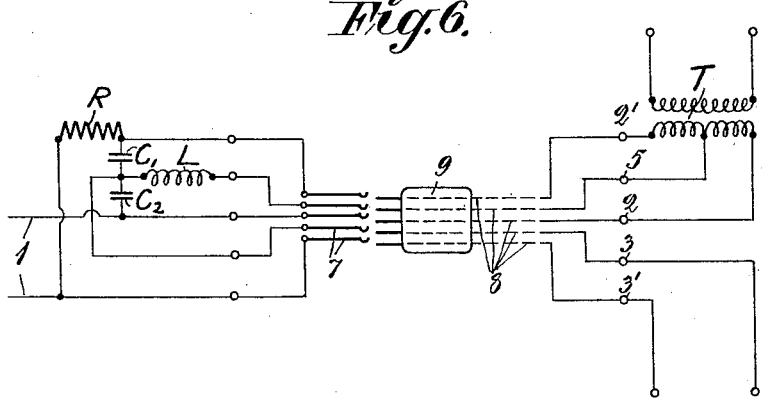

The invention will be more closely described with reference to the accompanying drawings, showing different embodiments of the invention. Figures 1 to 4 show different circuit arrangements having the two mutually adjusted branches connected into circuit, onesidedly in relation to the line and line balance. Figure 5 shows a circuit arrangement corresponding to that in Figure 4 in which the bridge is symmetrical in relation to the line. Figure 6 shows diagrammatically the application of the invention in a cord-amplifier device.

Figure 1:
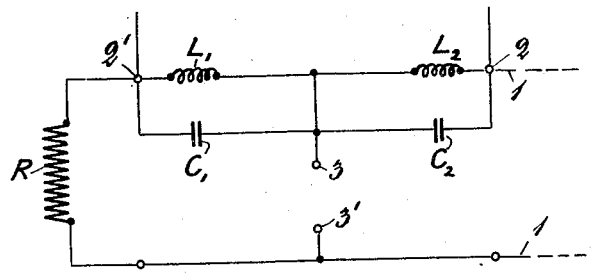

In a circuit arrangement according to Figure 1 two adjacent branches in the bridge are formed by the line 1 and by the line balance R consisting of an ohmic resistance. The two other branches in the bridge are formed by two series-connected, mutually equal inductances $L_1$, $L_2$ interconnected between the free terminals 2, 2' of the line and the line balance. Said inductances are each shunted by a condenser $C_1$ and $C_2$ respectively. The anode circuit in the amplifier for the one direction of speech is connected to the terminals 2, 2' on opposite sides of the inductances $L_1$, $L_2$. Between the terminals 3, 3' connected to the junction point between the inductances $L_1$, $L_2$ and the middle point of the opposing line branch respectively, the grid circuit in the other amplifier is connected. If desired, the two amplifiers may be connected into circuit in the reversed manner. It may be theoretically proved that by a suitable adjustment of the condensers $C_1$, $C_2$ in relation to each other and in relation to the inductances $L_1$, $L_2$ and the limiting frequency of the line, a ratio between the branches in the bridge formed by $L_1$, $C_1$ and $L_2$, $C_2$ respectively may be obtained which, with a good approximation for different frequencies, equals the ratio between the ohmic resistance R and the line impedance.

Figure 2:
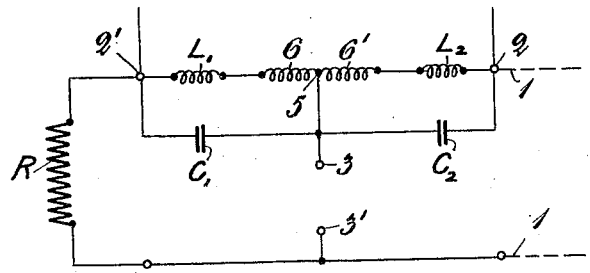

It may also be proved that one may connect an inductance 6, 6' having a middle tapping 5 symmetrically into circuit between the inductances $L_1$, $L_2$ in the manner shown in Figure 2 without thereby changing the operation of the circuit arrangement, provided the two winding branches 6 and 6' in the inductance are mutually tightly coupled.

Figure 3:
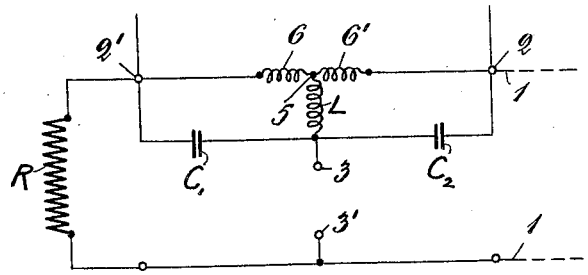

Figure 3 shows a further development of the inventive idea, the two inductances $L_1$, $L_2$ being then substituted by an impedance L interconnected between the middle point of the inductance and the junction point between the condensers $C_1$, $C_2$. It may be proved that this circuit arrangement is equivalent to the preceding arrangement provided the inductance L is suitably selected.

Figure 4:
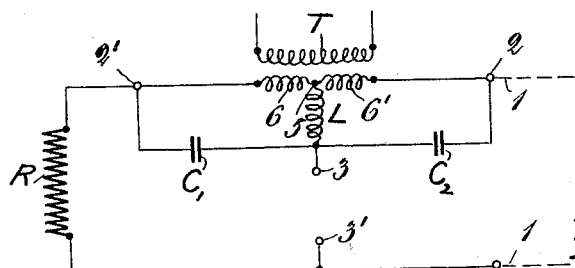

In a circuit arrangement according to Figure 4 the anode circuit in one amplifier is not directly, but through the intermedium of a differential transformer T, connected to the bridge, the secondary winding of which transformer is formed by the inductance 6, 6' in Figure 3. Otherwise the arrangement is the same as in the latter figure.

A theoretical calculation shows that the ratio between those two branches in the bridge, in which the two secondary winding branches of the differential transformer are included according to Figure 4, may be expressed by $$\frac{1-\omega^2 2LC_1}{1-\omega^2 2LC_2} \quad (1)$$

where $\omega$ is the angular frequency. The condition for balance at different frequencies is $$\frac{R}{Z}=\frac{1-\omega^2 2LC_2}{1-\omega^2 2LC_1} \quad (2)$$

where Z is the line characteristic.

In a pupinized or loaded line having a rising characteristic it is first of all necessary, in order to comply with the condition 2, that the balance impedance has the value $$R=\sqrt{\frac{l}{c}} \quad (3)$$

where $l$ is the inductance of the line and $c$ its capacity per unit length. If this value is inserted in the equation 2 the following equation is valid $$\frac{1-\omega^2 2LC_1}{1-\omega^2 2LC_2}=\sqrt{1-\left(\frac{\omega}{\omega_0}\right)^2} \quad (4)$$

where $\omega_0$ is the limiting frequency of the line. Said condition cannot be exactly complied with for all frequencies but a very good approximation may be obtained if one selects $$C_1=\frac{1}{8L\omega_0^2} \quad (5)$$

$$C_2=\frac{3}{8L\omega_0^2}$$

Said values refer as mentioned to a pupinized line having a rising characteristic. In a pupinized line having a falling characteristic $C_1$ should, on the other hand, be greater than $C_2$.

The condition 4 may, however, be complied with nearly, but with a less good approximation, in other manner than by the above described dimensioning of the condensers $C_1$, $C_2$. By way of example, the condenser $C_1$ may be entirely omitted in a pupinized line having a rising characteristic, $C_2$ then of course obtaining an entirely different value than that just set forth above.

To avoid reflections in the amplifier, the input impedance counted from the line should be equal to the characteristic Z of the pupinized line. This may be brought about approximately by a suitable dimensioning of the self-induction L. One has thus in this fact a possibility to dimension the balancing arrangement so that its input impedance reproduces the variations of the line characteristic with the frequency whereby distortions, on account of reflections as well as disturbing echo phenomena, are eliminated. In this regard the circuit arrangement according to the invention affords an essential advantage over previously known balancing arrangements.

Figure 5 differs from Figure 4 only therein that the differential transformer together with the impedances connected thereto is arranged symmetrically in relation to the line. The differential transformer is thus divided into two branches each included in one of the line branches and each consisting of two coils each being provided with one shunt condenser. The inductance L is also divided into two inductances each connected to one of the line branches. Under otherwise equal conditions each one of the shunt condensers should be twice, and each of the inductances one half of, the size required in a circuit arrangement according to Figure 4.

Figure 6 shows an application of the invention in a cord circuit repeater arrangement in an exchange. Each one of the lines 1 incoming to the exchange, one of which is shown in the Figure, is together with the appertaining line balance R and additional impedances $C_1$, $C_2$, L connected to different contact springs 7 in a jack in the operator's desk. The communication between different lines to be joined is mediated by a cord circuit repeater, of which the two sides may each be connected to one of the two lines through a cord 8 with the appertaining plug 9 which latter only is diagrammatically shown in the Figure. Only the one side of the cord circuit repeater is shown on the drawings. The different contacts in the plug are each connected to one of the terminals 2, 2', 3, 3', 5 corresponding to similarly designated terminals in Figure 4. The anode side in the repeater adapted for the one direction of speech may, as before, be connected to the primary winding of the differential transformer T whereas the grid circuit in said repeater adapted for the other direction of speech is connected to the terminals 3, 3'.

I claim:—

1. In a communicating system in combination a two-way transmission line, a balancing impedance, two additional impedances the ratio of which is variable with the frequency in substantially the same manner as the ratio between the line impedance and the balancing impedance, said additional impedances forming together with the line and the balancing impedance a balancing bridge, and two one-way lines associated with the bridge in balanced relationship.

2. In a communicating system in combination a two-way transmission line, a balancing impedance substantially consisting of an ohmic resistance, two additional impedances the ratio of which is variable with the frequency in substantially the same manner as the ratio between the line impedance and the balancing impedance, said additional impedances forming together with the line and the balancing impedance a balancing bridge, and two one-way lines associated with the bridge in balanced relationship.

3. In a communicating system in combination a pupinized two-way transmission line, a balancing impedance including an ohmic resistance substantially equal to the surge impedance of said pupinized line, two additional impedances the ratio of which is variable with the frequency in substantially the same manner as the ratio between the line impedance and the balancing impedance, said additional impedances forming together with the line and the balancing impedance a balancing bridge, and two-way lines associated with the bridge in balanced relationship.

4. In a communicating system in combination a two-way transmission line, a balancing impedance, a differential transformer forming together with the two-way transmission line and the balancing impedance a balancing bridge, two additional impedances associated with the mutually equal halves of said differential transformer and having a ratio which is variable with the frequency in substantially the same manner as the ratio between the line impedance and the balancing impedance, and two one-way lines associated with the differential transformer in balanced condition.

5. In a communicating system in combination a two-way transmission line, a balancing impedance, a differential transformer forming together with the two-way transmission line and the balancing impedance a balancing bridge, two additional impedances including each a shunt condenser associated with each one of the two halves of the two-part winding of the differential transformer, said additional impedances having a ratio which is variable with the frequency in substantially the same manner as the ratio between the line impedance and the balancing impedance, and two one-way lines associated with the differential transformer in balanced condition.

6. In a communicating system in combination a two-way transmission line, a balancing impedance, a differential transformer, forming together with the two-way transmission line and the balancing impedance a balancing bridge, two additional impedances including each a shunt condenser associated with each one of the two halves of the two-part winding of the differential transformer and comprising in common an inductance connection between the middle tapping of the differential transformer and the junction point between the shunt condensers, said additional impedances having a ratio which is variable with the frequency in substantially the same manner as the ratio between the line impedance and the balancing impedance, and two one-way lines associated with the differential transformer in balanced condition.

7. A line balancing circuit arrangement as claimed in claim 6, characterized in that the inductance is so adjusted that the input impedance of the arrangement counted from the line is substantially equal to the line characteristic.

8. A line balancing circuit arrangement as claimed in claim 6 in connection with a pupinized transmission line, characterized in that the two shunt condensers included in each one of the said two additional impedances have substantially the values $$\frac{1}{8L\omega_0^2}$$

and $$\frac{3}{8L\omega_0^2}$$

respectively, where $\omega_0$ is the cut off frequency of the transmission line and $L$ is the inductance value of the said common inductance connection, the larger one of said two condensers being included adjacent to that one of the branches in the bridge including the transmission line and the balancing impedance respectively which has the larger characteristic impedance.

9. A line balancing circuit arrangement as claimed in claim 1 having a cord amplifier device, characterized in that each one of the incoming lines to be joined, together with the appertaining line balance and additional impedances, is connected to contact springs in a jack in the operator's desk whereas the differential transformer is included in the cord circuit repeater which, upon joining two lines, is connected to the corresponding jacks.

In testimony whereof I affix my signature.

TORBEN LAURENT.